United States Patent [19]
Chitwood

[11] Patent Number: 5,657,582
[45] Date of Patent: Aug. 19, 1997

[54] RAIN GUTTER DOWNSPOUT NOISE ATTENUATION APPARATUS

[76] Inventor: Mark L. Chitwood, 3159 Seminole Dr., Redding, Calif. 96001

[21] Appl. No.: 667,624

[22] Filed: Jun. 21, 1996

[51] Int. Cl.⁶ .............................. E04D 13/04; E04B 1/74; F16L 55/02; G10K 11/16
[52] U.S. Cl. .................................. 52/16; 52/144; 138/39; 138/109; 181/207
[58] Field of Search ............................ 52/16, 169.5, 144; 285/183; 138/39, 109; 181/207, 208, 233, 234, 252, 256, 264, 212, 217, 224, 281

[56] References Cited

U.S. PATENT DOCUMENTS 4,184,638  1/1980  Ogasawara et al. .
4,730,786  3/1988  Nelson .
5,159,789  11/1992  Haapanen .
5,243,153  9/1993  Holwerda .

Primary Examiner—Robert Canfield
Attorney, Agent, or Firm—John D. Gugliotta; David L. Volk

[57] ABSTRACT

A rain gutter downspout noise attenuation apparatus is provided formed by a section of downspout made of sheet metal, or other suitable material, lined with artificial grass and a fastening screw or clip. The sheet metal, shaped in the form of a 160 degree angle, is designed as such that it easily fits into the base of the downspout, with the curve segment situating in the curve of the elbow.

3 Claims, 2 Drawing Sheets

RAIN GUTTER DOWNSPOUT NOISE ATTENUATION APPARATUS

RELATED APPLICATIONS AND DISCLOSURE DOCUMENTS

This application is a continuation of the invention described in the Disclosure Document No. 389,012, dated Nov. 30, 1995.

BACKGROUND OF THE INVENTION

1. Field of the Invention

The present invention relates generally to noise attenuation apparatus and, more particularly, to a rain gutter downspout noise attenuation apparatus.

2. Description of the Related Art

In the related art, many methods are known for attenuating the noise cause by the draining of rainwater down a gutter downspout. A primary known example includes U.S. Pat. No. 5,159,789, issued in the name of Haapanen. Additionally, in U.S. Pat. No. 5,243,153, issued in the name of Holwerda, an acoustical barrier with acoustical seal is disclosed which may also be adapted for such use. However, such systems made in accordance with these reference are associated with several drawbacks. For example, they are not easily adaptable with existing, standard rain gutter designs. Moreover, they are not inexpensive, easy to install and replace, and adaptable to any angular orientation. Consequently, a need has been felt for providing such an apparatus and method.

SUMMARY OF THE INVENTION

It is therefore an object of the present invention to provide an improved rain gutter downspout noise attenuation apparatus.

It is a feature of the present invention to provide an improved rain gutter downspout noise attenuation apparatus which is easily adaptable with any standard downspout design, as well as installable in existing downspout locations.

Briefly described according to the preferred embodiment of the present invention, a rain gutter downspout noise attenuation apparatus is provided which comprises a section of downspout made of sheet metal, or other suitable material, lined with artificial grass and a fastening screw or clip. The sheet metal, shaped in the form of a 160 degree angle, is designed as such that it easily fits into the base of the downspout, with the curve segment situating in the curve of the elbow.

An advantage of the present invention is that noise resulting from rain making contact with the downspout is reduced or eliminated.

Another advantage of the present invention is that it easy to install.

Further, a preferred embodiment of the present invention can be incorporated into either new, or existing water drainage systems, and can accommodate any standard gutter or downspout design.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE PREFERRED EMBODIMENTS

Figure 1:
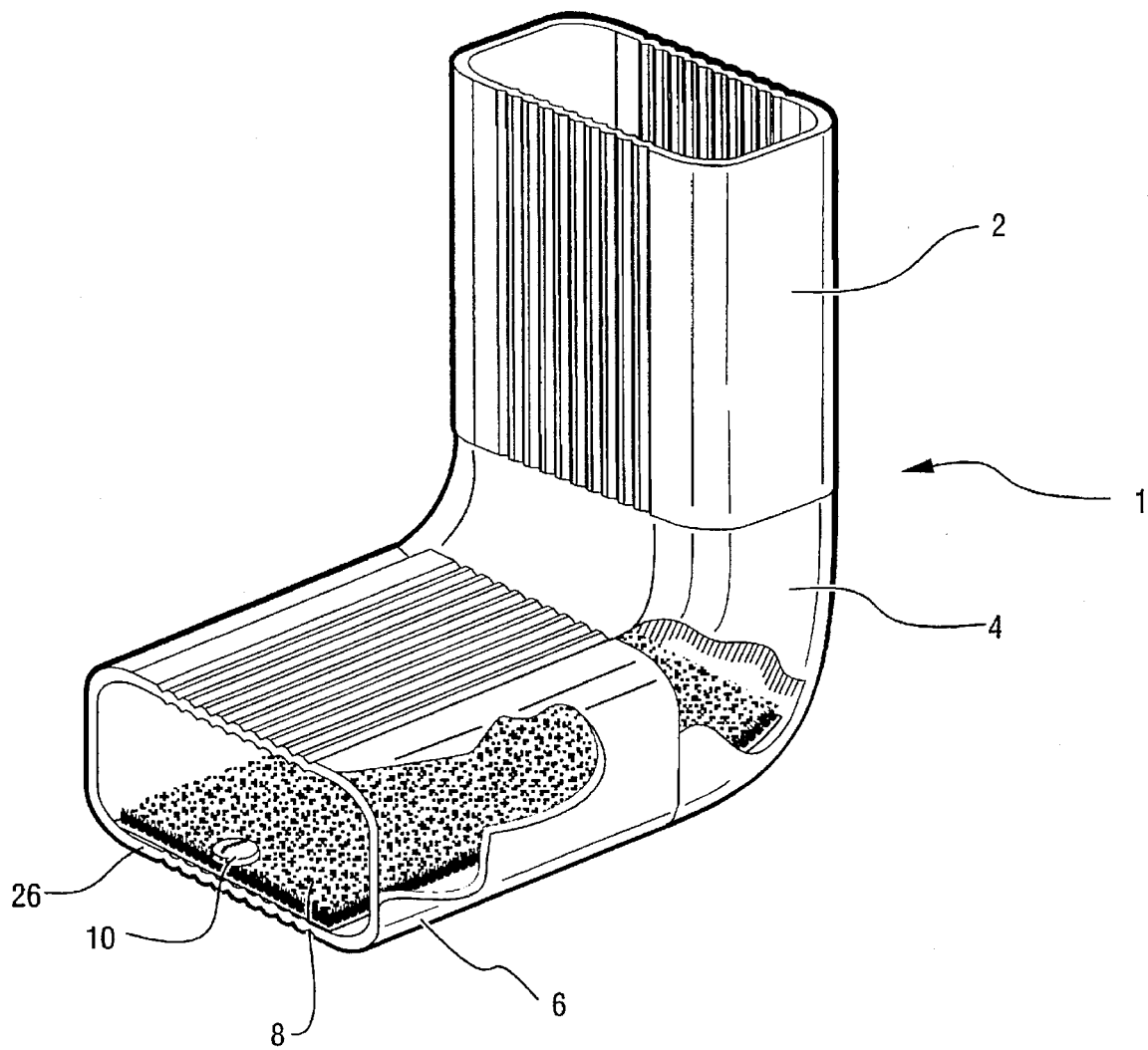
FIG. 1 is a cutaway perspective view of the rain gutter downspout noise attenuation apparatus according to the preferred embodiment of the present invention.

The general nature and utility of this rain gutter downspout and noise attenuation apparatus 1 may be understood by reference to the Figures. A typical gutter and downspout system is shown in FIG. 1. Water flows through a vertical downspout section 2 into an angled downspout section 4, and continues to flow through a horizontal downspout section 6 until the water is directed to the ground or into a drain or sewer. As shown in FIG. 1, the angled downspout section 4 and horizontal downspout section 6 contain the noise baffle 8 of the present invention. The noise baffle 8 may be secured to a base 26 of the downspout by either a nail 10, shown in FIG. 2, or a clip 10 shown in FIG. 3. Once installed, the noise baffle 8 will reduce or eliminate the noise resulting from water dripping into the angled section of the downspout 4.

Figure 2:
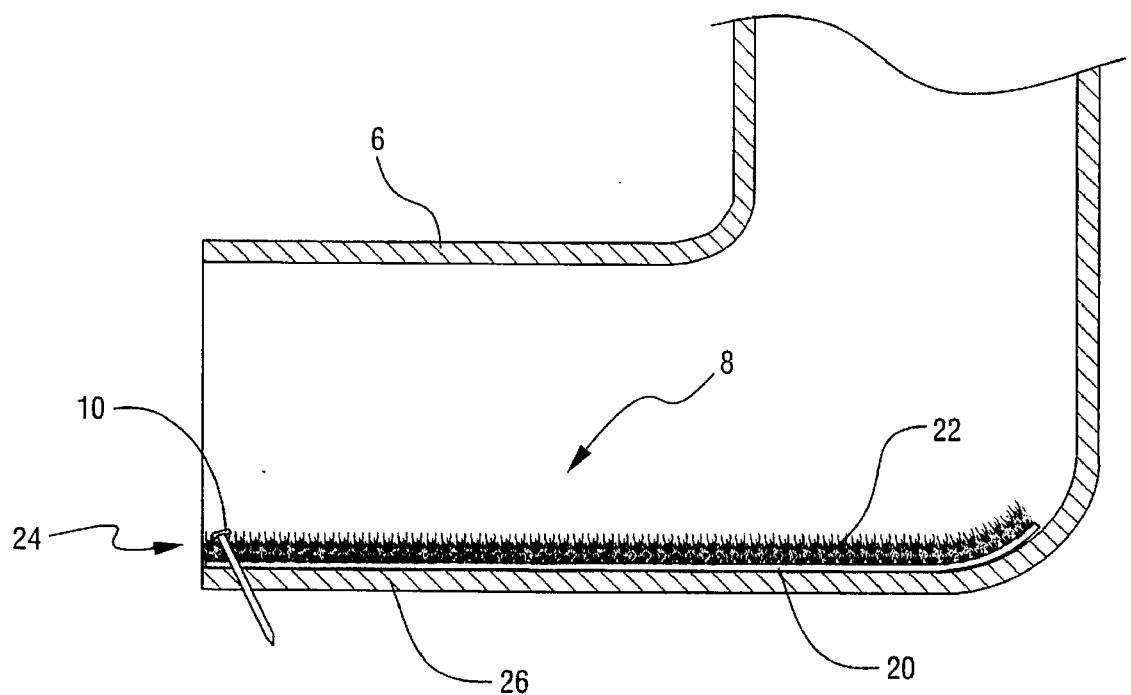
FIG. 2 is a cross sectional side view thereof utilizing a first attachment means 10 for securing the noise baffle.
Figure 3:
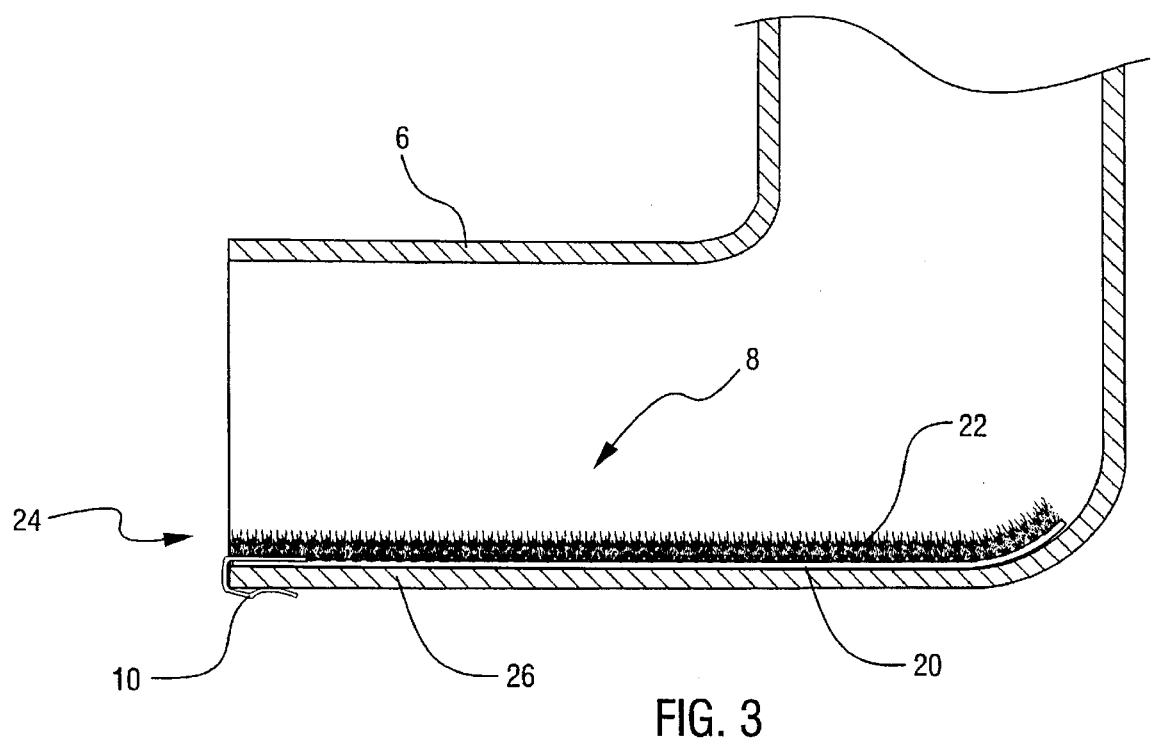
FIG. 3 is a cross sectional side view thereof utilizing a second attachment means 10 for securing the noise baffle.

FIG. 2 and FIG. 3 are side cross sectional views of the apparatus 1 which consists of a molded sheet metal base 20, a layer of artificial grass 22 affixed to the sheet metal base 20, and a screw or clip 10 to attach the flat edge 24 of the noise baffle to the base 26 of the horizontal downspout section 6. Although the present description identifies a sheet metal base 20 and a layer of artificial grass 22; any other convenient and suitable material may be substituted. The width of the noise baffle is slightly smaller than the width of a typical downspout, or approximately 3 inches. The length of the noise baffle is approximately 6 inches. As FIG. 2 and FIG. 3 indicate, the edge of the noise baffle that fits into the angled downspout section is curved upward at 160 degrees in order to conform more closely to the shape of the angled downspout section. As shown, a layer of artificial grass 22 covers the upper side of the sheet metal base 20 and is secured to it by an adhesive.

As shown in FIG. 1, the curved edge of the noise baffle 8 is inserted into the horizontal downspout section 6 and is pushed back into the downspout until the curved edge meets the angled downspout section 4. A screw or clip 10 is then used to attache the noise baffle 8 to the base of the horizontal downspout section 6.

The foregoing description is included to illustrate the operation of the preferred embodiment and is not meant to limit the scope of the invention. The scope of the invention is to be limited only by the following claims.

What is claimed is:

1. A rain gutter downspout noise attenuation apparatus comprising:
    an angled downspout section adapted to be affixed to and in fluid communication with a substantially vertical downspout section;
    a straight downspout section affixed to and in fluid communication with said angled downspout section;
    the straight downspout section having a base;
    a noise baffle secured to the base of the straight downspout section;
    said noise baffle comprising a sheet metal base having an upper surface and a layer of artificial grass affixed to said upper surface of said sheet metal base; and said noise baffle being curved upward in order to conform to the shape of the angled downspout section.

2. A rain gutter downspout and noise attenuation apparatus comprising:

a substantially vertical downspout section;

an angled downspout section affixed to and in fluid communication with said substantially vertical downspout section;

a substantially horizontal downspout section affixed to and in fluid communication with said angled downspout section;

the substantially horizontal downspout section having a base;

a noise baffle secured to the base of the substantially horizontal downspout section;

said noise baffle comprising a sheet metal base having an upper surface and a layer of artificial grass affixed to said upper surface of said sheet metal base; and said noise baffle being curved upward in order to conform to the shape of the angled downspout section.

3. A rain gutter downspout and noise attenuation apparatus comprising:

a vertical downspout section;

an angled downspout section affixed to and in fluid communication with said vertical downspout section;

a horizontal downspout section affixed to and in fluid communication with said angled downspout section;

the horizontal downspout section having a base;

a noise baffle secured to the base of the horizontal downspout section;

said noise baffle comprising a molded sheet metal base having an upper surface and a layer of artificial grass affixed to said upper surface of said sheet metal base;

said noise baffle being approximately 3 inches wide and 6 inches long; and said noise baffle being curved upward at 160 degrees in order to conform to the shape of the angled downspout section.

\* \* \* \* \*